United States Patent [19]

Bebok

[11] 4,388,061
[45] Jun. 14, 1983

[54] GUIDE ASSEMBLY FOR CYLINDRICAL PLASTIC TUBES

[75] Inventor: Janos B. Bebok, Mississauga, Canada

[73] Assignee: Macro Engineering Company Ltd., Mississauga, Canada

[21] Appl. No.: 284,170

[22] Filed: Jul. 17, 1981

[51] Int. Cl.³ .............................................. B29D 7/22
[52] U.S. Cl. .................................... 425/392; 264/566; 425/326.1; 425/445
[58] Field of Search .................. 425/392, 326.1, 387.1; 264/565, 564, 566, 563, 569

[56] References Cited

U.S. PATENT DOCUMENTS

| | | | |
|---|---|---|---|
| 3,223,762 | 12/1965 | Fry, Jr. | 264/564 |
| 3,417,434 | 12/1968 | Hafner | 425/392 |
| 3,522,630 | 8/1970 | Swickard, Jr. | 425/326.1 |
| 3,596,321 | 8/1971 | Upmeier | 425/172 |
| 3,749,540 | 7/1973 | Upmeier | 425/326.1 |
| 3,930,781 | 1/1976 | Upmeier | 425/326.1 |
| 3,958,913 | 5/1976 | Stangl | 425/392 |
| 3,980,418 | 9/1976 | Schott, Jr. | 425/326.1 |

*Primary Examiner*—Jeffery R. Thurlow
*Attorney, Agent, or Firm*—Hirons, Rogers & Scott

[57] ABSTRACT

A guide assembly for blown plastic tubes to guide and support the tube after its extrusion from a die consists of a frame carrying a plurality of pairs of vertically-extending members distributed circumferentially around the tube. Each of the vertically-extending members carries a plurality of vertically-spaced parallel radially-inwardly-extending arms. Each arm of one vertical member of the pair cooperates with a respective arm of the other member of the pair, each cooperating pair of arms having a flexible wire support member extending between these ends, the wire engaging the tube and conforming to its circumference. As the tube diameter decreases the arms are moved simultaneously radially inward by opposite rotation of the respective vertical members, whereupon the wire conforms to the new reduced diameter, and vice-versa. The actual contact of the support member with the tube is by side-by-side cylindrical rollers (e.g. of nylon) threaded on the wire. An additional support means may be provided that engages the center of the guide wire and, in addition to preventing downward sagging, automatically presses it radially inward with an increasing force as the tube diameter is decreased.

10 Claims, 9 Drawing Figures

GUIDE ASSEMBLY FOR CYLINDRICAL PLASTIC TUBES

FIELD OF THE INVENTION

The present invention is concerned with improvements in or relating to guide assemblies of the type employed for the guidance and also the support of a cylindrical tube of plastic film as it issues from its forming die.

REVIEW OF THE PRIOR ART

Processes for the production of plastic film by extrusion of a cylindrical tube thereof from a die usually require that the tube be guided and supported over the critical portion of its path, i.e. from the frost line to the place where it has cooled sufficiently to be stable. Such support and guidance is required particularly when the tube has been expanded by internal pressure to reduce the thickness of the film. The principal problem with such a guide and support assembly is the need for it to accommodate tubes of quite widely different diameters, since otherwise the operator is limited in the range of film thickness which can be produced. A common solution is to construct the assembly with its guide and support members forming a uniform diameter circle around the bubble at some median diameter value, and to accept the fact that the circles will not be as uniform in diameter with bubbles of larger and smaller diameter than the median.

DEFINITION OF THE INVENTION

It is therefore an object of the present invention to provide a new guide assembly for extruded cylindrical plastic tubes adapted to accommodate a relatively wide range of diameters.

In accordance with the present invention there is provided a guide assembly for the guidance of a cylindrical tube of plastic material in its travel path from a forming die comprising:
- a longitudinal support frame adapted to extend along the portion of the travel path in which guidance is to be provided;
- a plurality of pairs of longitudinal members mounted by the frame circumferentially spaced around the said travel path for rotational movement about respective longitudinal axes parallel to one another and to the said travel path portion;
- means for moving the two longitudinal members of each pair simultaneously in opposite directions of rotation about their respective longitudinal axes;
- each longitudinal member carrying a plurality of longitudinally-spaced, parallel radially-extending arms, each arm of one longitudinal member being associated with a cooperating arm of the other longitudinal member of the said pair thereof;
- each two cooperating arms having connected thereto at respective connection positions a respective guide member that is transversely flexible along its length between said connection positions to permit change of curvature thereof, and adapted for guiding engagement with the external surface of a tube in the travel path and to conform with the diameter thereof;
- said simultaneous opposite rotational movement of the two members of each pair causing corresponding inward or outward movement of the said arm connection positions respectively toward or away from the travel path to permit the guide member to change its curvature and thereby conform respectively to tubes of smaller or larger diameter.

DESCRIPTION OF THE DRAWINGS

A guide assembly that is a particular preferred embodiment of the invention will now be described, by way of example, with reference to the accompanying diagrammatic drawings, wherein.

DESCRIPTION OF THE PREFERRED EMBODIMENTS

The assembly is employed for the guidance and support of a vertically-upwardly moving cylindrical tube 10 of plastic material that issues from a die 12 of an extruder (not shown). The tube may be maintained at the diameter at which it issues from the die, but it is more usual for it to be blown to a larger diameter and correspondingly smaller film thickness by introducing air under pressure to the interior of the "bubble" formed by the tube. The assembly surrounds the tube at a location along its path such that the lowest guide member to touch the tube does so above the frost line at which the molten polymer has solidified sufficiently for such contact. Shortly after the tube leaves the assembly it is passed into the nip of a pair of gathering rolls (not shown). The assembly is therefore effective during a critical portion of the travel path of the tube while it is still relatively unstable and could otherwise readily be deformed out of its truly cylindrical shape to result in film of non-uniform thickness.

Figure 3:
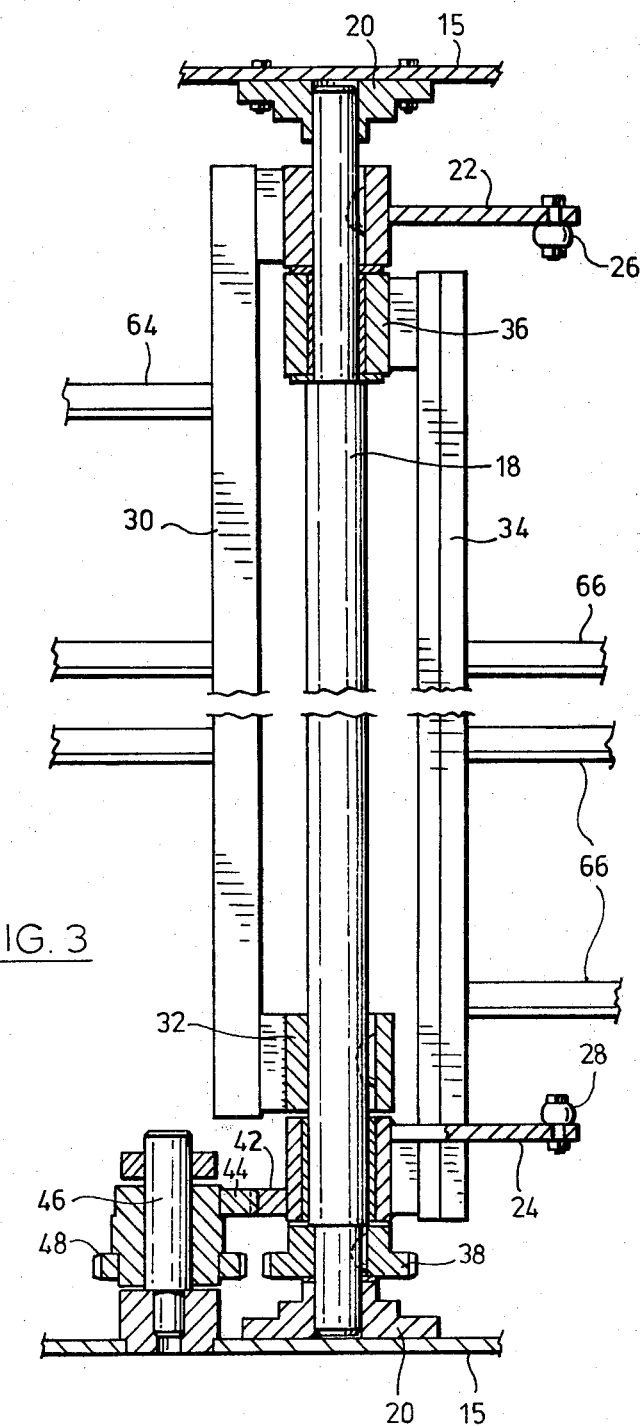
FIG. 3 is a section taken on the line 3—3 of FIG. 2.

The assembly comprises a rigid frame of square horizontal cross-section and rectangular vertical cross-section constituted by rigidly-connected vertical members 14 and horizontal members 15. The frame usually is mounted around the travel path of the tube by suspending it from an overhead support, for example via cables 17. Referring particularly to FIG. 3 there is mounted at each of the four corners of the frame a vertically-extending longitudinal support shaft 18 mounted for rotation about a corresponding vertical axis by end bearings 20. Each shaft has mounted thereon a pair of triangular plates 22 and 24 constituting respective bellcrank levers rotatable about the said vertical axis. The four plates 22 at the upper ends of the levers are connected by rigid rods 26 for simultaneous pivoting movement about the said vertical axis, while the four plates 24 at the lower ends are similarly connected by rigid rods 28. Each of the rods is pivotally connected at its ends to the respective plates and, if required, may be adjustable in length for adjustment of the phase of rotation of the four support shafts 18.

Figure 1:
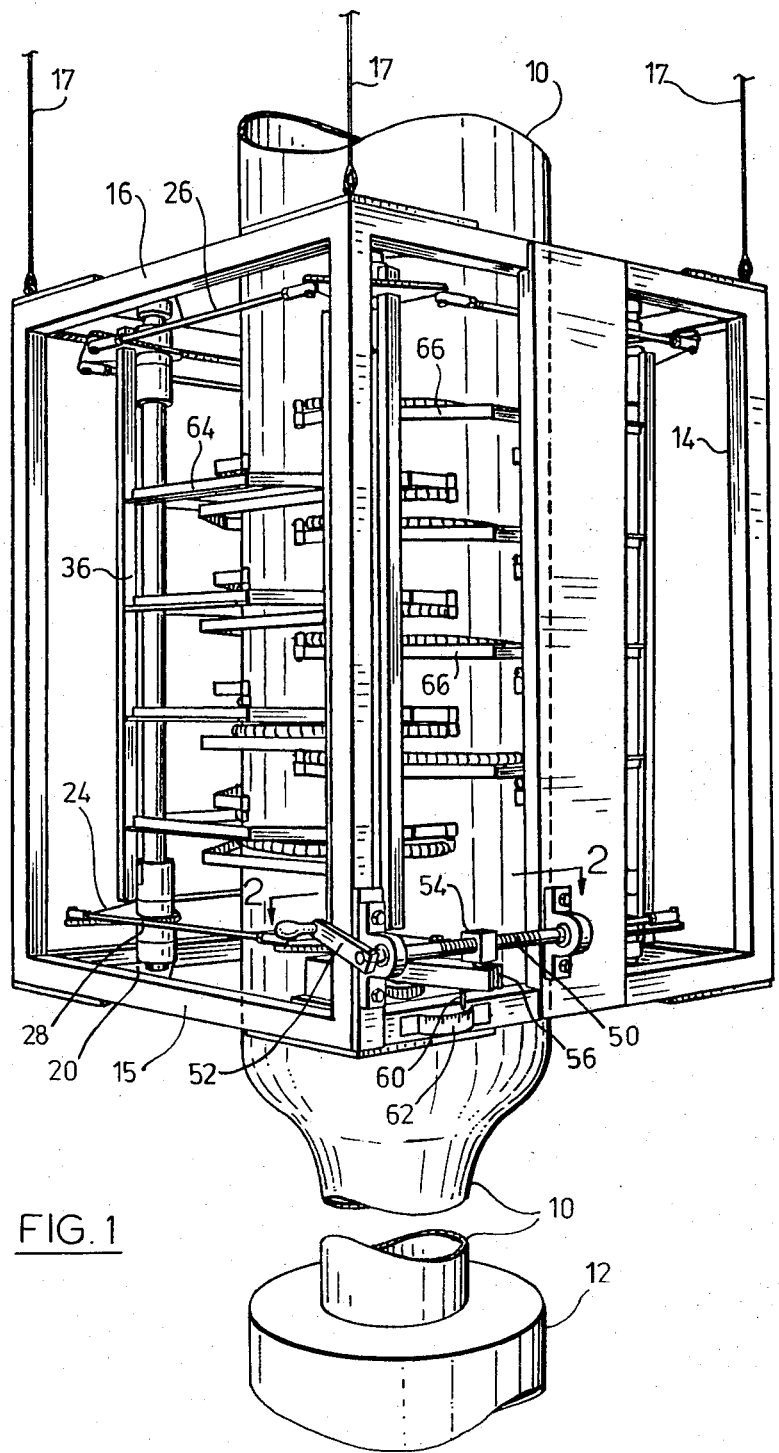
FIG. 1 is a perspective view of the assembly from one side and slightly below.
Figure 2:
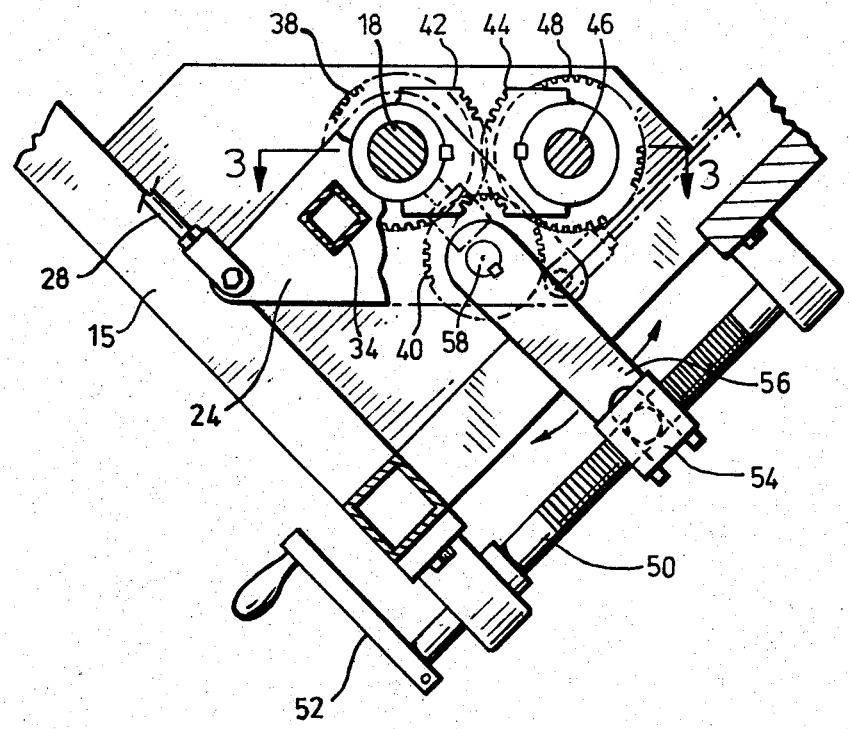
FIG. 2 is a section taken on the line 2—2 of FIG. 1 to show in greater detail the gear mechanism for adjusting the assembly to accommodate cylindrical plastic tubes of different diameters.

The upper plates 22 are rigidly connected to their support shafts 18 to rotate therewith about their respective vertical longitudinal axes and vertically-extending arm-supporting members 30 have their upper ends connected to the respective plate 22, while their lower ends are fastened to collars 32 also connected rigidly to the shafts 18. The lower plates 24 are freely rotatable on the shafts 18 and vertically-extending arm-supporting members 34 have their lower ends connected to the respective plate 24, while their upper ends are fastened to collars 36 also freely rotatable on the shafts 18. A pinion gear 38 is fastened to the lower end of one of the shafts 18 and is engaged by pinion gear 40, so that rotation of the latter causes simultaneous rotation of all of the support shafts 18 via plates 22 and connections 26, and consequent rotation of longitudinal members 30 in a first direction thereof. A pinion gear quadrant 42 is fastened to the plate 24 above the gear 38 and engages another gear quadrant 44 on a shaft 46; a pinion gear 48 on the shaft 46 also engages the gear 40. Thus rotation of the gear 40 also causes simultaneous rotation of all of the plates 24 and consequent rotation of longitudinal members 34 in a second direction opposite to that of the members 30. The required rotation of gear 40 to produce this simultaneous opposite rotation of the members 30 and 36 is in this embodiment produced by rotation of a screw 50 by operator's handle 52, thereby moving longitudinally a traveller 54 that is engaged in a yoke-shaped end of arm 56 fixed to the shaft 58 on which gear 40 is mounted. A pointer 60 (FIG. 1) on the arm 56 cooperates with a scale 62 on the frame.

Figure 5:
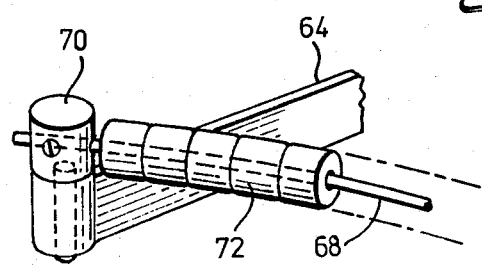
FIG. 5 is an enlarged perspective view to show the detail of construction of the flexible guide members which extend between the assembly arms and for guiding engagement with the tube.

Each of the longitudinal members 30 carries a plurality of vertically longitudinally spaced radially-inwardly extending arms 64, while each of the longitudinal members 34 carries a like plurality of similar arms 66. Each arm 64 has an immediately adjacent arm 66 cooperating therewith, the two arms being as close together vertically as possible and crossing each other as seen in plan. A flexible wire support member 68 extends between the ends of each two cooperating arms 64 and 66 to engage the outside surface of the plastic tube 10 for its guidance and support. As is seen in FIG. 5 each end of the wire member 68 is clamped in a member 70 mounted on the respective arm end for pivoting movement about a respective vertical axis. Each member 68 carries a sufficient number of rollers 72 to extend the full length of the wire between the members 70 in side-by-side contact with one another, the rollers being freely rotatable on the wire to minimize their frictional contact with the tube surface. These rollers preferably are of a plastic material such as a nylon or TEFLON (trade mark).

Figure 4:
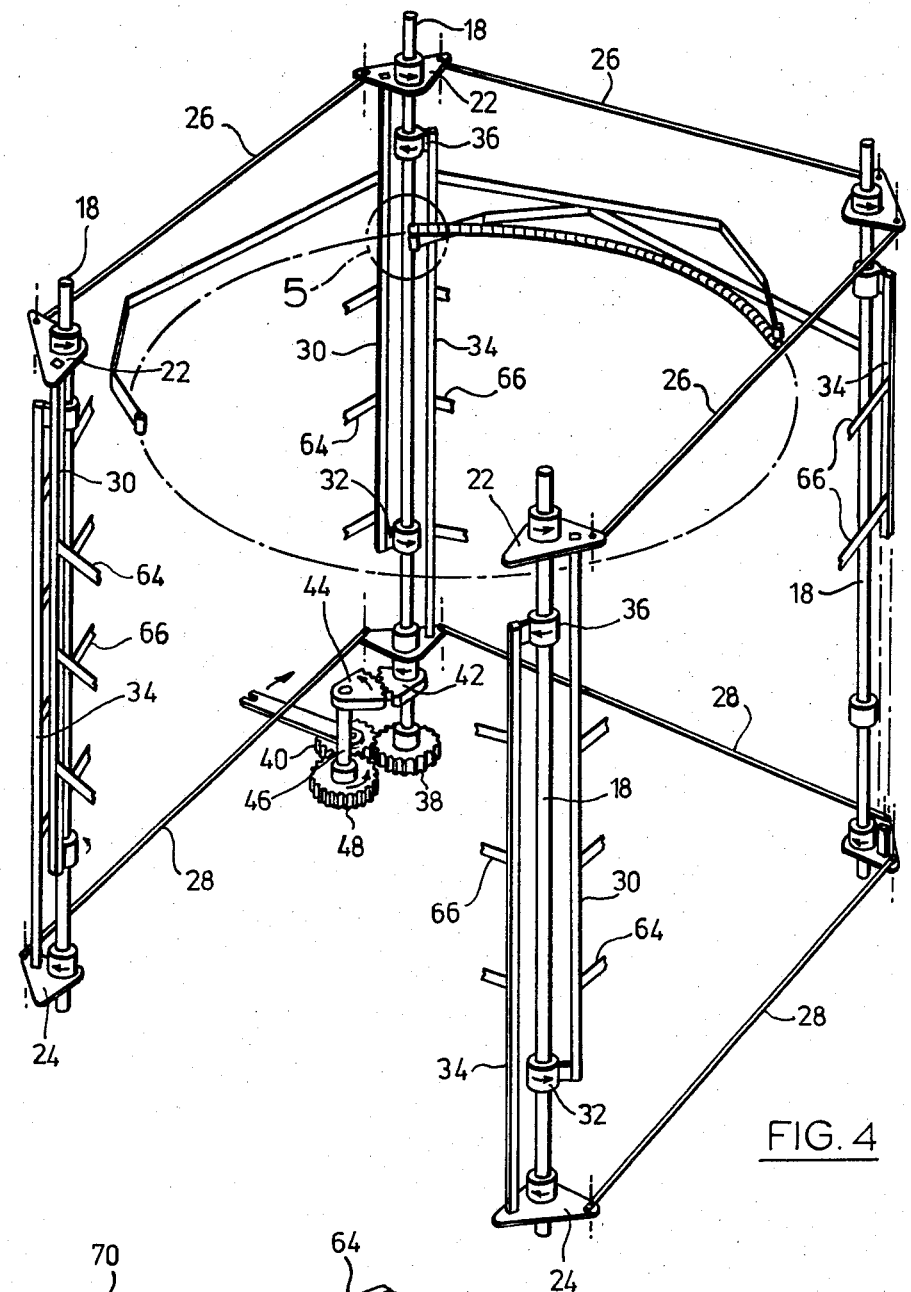
FIG. 4 is a diagrammatic perspective view from one side and slightly above with parts thereof removed so as to show only the arm-supporting longitudinal members and the manner in which they are interconnected and moved.
Figure 6:
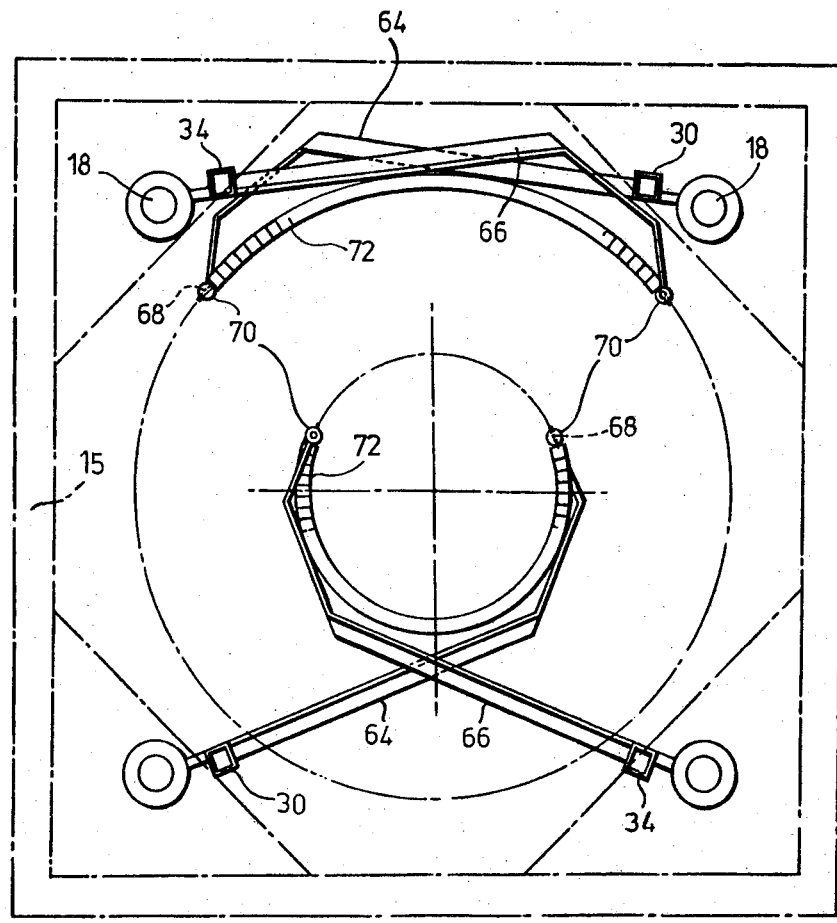
FIG. 6 is a plane transverse cross-section to illustrate the maximum and minimum diameters of tubes that the assembly can accommodate.
Figure 7:
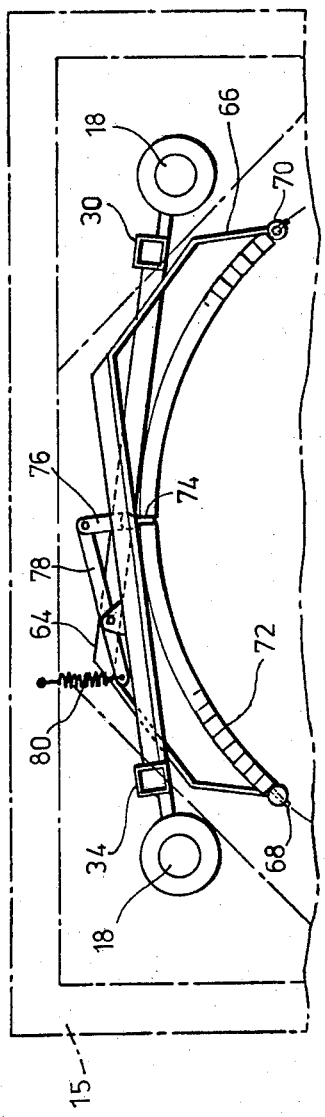
FIG. 7 is a part plane transverse cross-section, as with FIG. 6, to illustrate a support for the flexible guide members as operative with a tube of maximum diameter.

In FIG. 4, upper part of FIG. 6 and FIG. 7 the members 30 and 34 and arms 64 and 66 are shown in a radially-outermost position for the support members 68 to conform to the circumference of a tube of the greatest diameter to be handled by the assembly. The length of the member 68 is such that in this position it extends over a 90° quadrant of the circumference plus an additional amount of about 5°, so that the tube is guided over its entire circumference. The diameter of the tube is indicated by scale 62. If the blow-up ratio of the tube 10 is decreased and a smaller-diameter tube is produced the handle 52 is rotated, rotating the two cooperating longitudinal members 30 and 34 in opposite directions about their respective axes, and thus moving the ends of the arms 64 and 66 radially inwards, the member 68 being sufficiently flexible to accommodate itself to the reduced tube diameter and therefor still providing the necessary guidance and support.

It is found possible to provide with a particular apparatus for a ratio of minimum to maximum diameter of about 2:1 to 2.5:1. Thus, for example, one embodiment is able to accommodate tubes 10 of diameter from about 25 cm to about 50 cm and employs support members 68 of steel piano wire of 0.236 cm (0.093 inch) diameter. Another embodiment can accommodate tubes of diameter from about 56 cm to about 142 cm and employs support members 68 of 0.472 cm (0.187 inch) diameter. The frame will usually extend to a height of about 2 meters and a typical embodiment will have about 9 or 10 sets of vertically spaced arms each set consisting of four pairs of arms.

Figure 9:
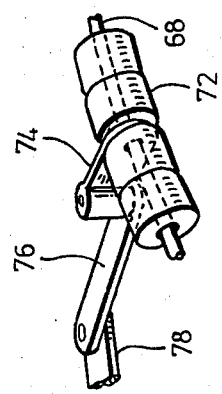
FIG. 9 is an enlarged perspective view of a detail of construction of the support of FIGS. 7 and 8.
Figure 8:
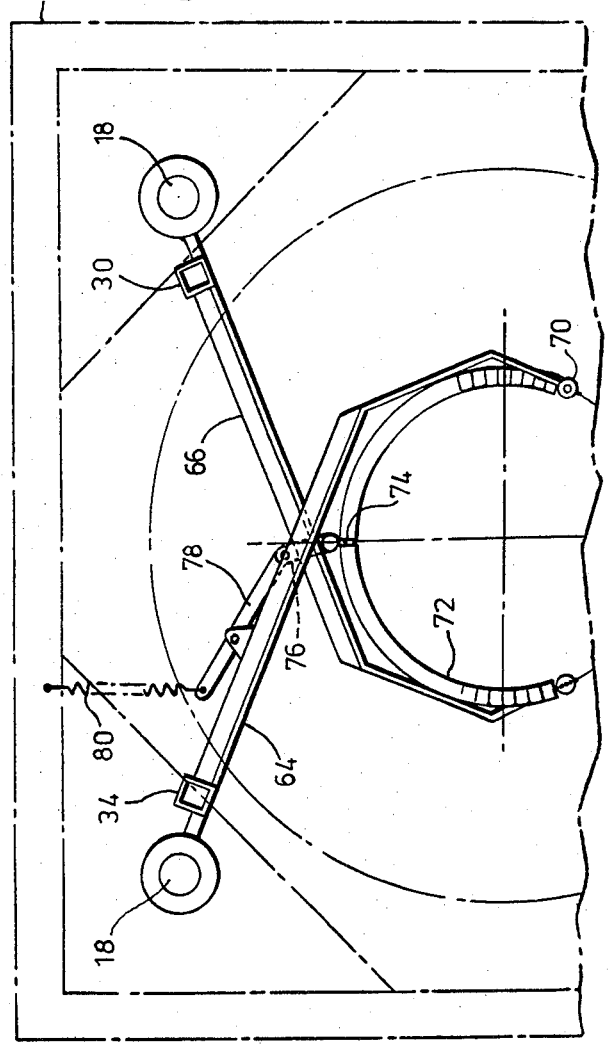
FIG. 8 is another such plane transverse cross-section to illustrate the operation of the support when the tube is of minimum diameter.

It is found especially with embodiments intended for larger diameter tubes, that as the radius of the tube decreases and the support member 68 is wrapped over a greater segment of the tube circumference, the central portion of the support member tends to sag away from tube. This tendency is prevented by the provision of a central support member, a preferred embodiment of which is illustrated by FIGS. 7 to 9. Thus, each wire 68 passes through an aperture in an arm 74 that is pivoted about a vertical axis to another arm 76. The arm 76 is in turn pivoted by another vertical axis pivot to a second order lever 78 pivoted about a further vertical axis pivot to the respective arm 66. The other end of the lever 78 is connected by a tension spring 80 to the adjacent frame member 15. With the tube at maximum diameter as illustrated by FIG. 7 the support means will be effective to support the guide member 68 against downward sagging under gravity, but the spring 80 is contracted and provides little or no radially-inward thrust of arm 74 against the tube. As the tube diameter is decreased and the arm 64 moves radially inward the spring 80 is stretched progressively and applies a progressively-increasing radially-inwardly acting force to hold the member in close contact with the tube surface.

Although in the embodiment specifically illustrated there is provided a single support shaft 18 carrying two arm-supporting members 30 and 34, in other embodiments it may be preferred to mount each of the members 30 and 34 on a separate support shaft. Some mechanical simplification results since there is no need to arrange for two oppositely-rotating members on the same support shaft, and thus simplification can offset the cord etc. of the additional number of support shafts that are required.

It will be seen therefore that I have provided a guide and support structure for plastic tubes, particularly blown plastic tubes that is simple in structure and is able to accommodate tubes of relatively widely different diameters with adequate support and guidance.

We claim:

1. A guide assembly for the guidance of a cylindrical tube of plastic material in its travel path from a forming die comprising:
   a longitudinal support frame adapted to extend along the portion of the travel path in which guidance is to be provided;
   a plurality of pairs of longitudinal members mounted by the frame circumferentially spaced around the said travel path for rotational movement about respective longitudinal axes parallel to one another and to the said travel path portion;
   means for moving the two longitudinal members of each pair simultaneously in opposite directions of rotation about their respective longitudinal axes;
   each longitudianl member carrying a plurality of longitudinally-spaced, parallel radially-extending arms, each arm of one longitudinal member being associated with a cooperating arm of the other longitudinal member of the said pair thereof;
   each two cooperating arms having connected thereto at respective connection positions a respective guide member that is transversely flexible along its length between said connection positions to permit change of curvature thereof, and adapted for guiding engagement with the external surface of a tube in the travel path and for change of its curvature to conform with the diameter thereof;
   said simultaneous opposite rotational movement of the two members of each pair causing corresponding inward or outward movement of the said arm connection positions respectively toward or away from the travel path to permit the guide member to change its curvature and thereby conform respectively to tubes of smaller or larger diameter.

2. A guide assembly as claimed in claim 1, wherein the two immediately adjacent longitudinal members of two immediately adjacent pairs thereof are mounted for rotation in opposite directions of rotation by a common longitudinal support member mounted by the frame and on which the members are mounted.

3. A guide assembly as claimed in claim 2, wherein a first of the two said immediately adjacent longitudinal members is fastened to a respective vertical support shaft mounted by the frame for rotation about a respective vertical axis and is rotatable with the shaft in a first direction of rotation, the second of the two longitudinal members is mounted on the said vertical support shaft for rotation relative thereto, and there are provided gear means connected to each of the two longitudinal members for producing rotation thereof in opposite directions.

4. A guide assembly as claimed in claim 1, and comprising four pairs of the said longitudinal members, the members being mounted by the frame at the four corners of a square frame.

5. A guide assembly as claimed in claim 1, wherein means connecting each arm and the respective flexible guide member permit pivoting movement about a longitudinal axis parallel to the respective longitudinal axis of the longitudinal member.

6. A guide assembly as claimed in claim 1, wherein each flexible guide member comprises a flexible wire having mounted thereon a plurality of freely rotating cylindrical members the surfaces of which engage the tube surface for support thereof.

7. A guide assembly as claimed in claim 1, and including support means mounted by a respective arm and engaging the center of the respective flexible guide member to support it against sagging under gravity downwards in the travel path.

8. A guide assembly as claimed in claim 1, and including support means mounted by a respective arm and engaging the respective flexible guide member to urge it radially inwards against the surface of a tube in the travel path.

9. A guide assembly as claimed in claim 8, and including means increasing the radially-inwardly urging force as the respective arm is moved radially inwards.

10. A guide assembly as claimed in claim 9, wherein the said means increasing the urging force comprises a second-order lever having one end connected to the flexible guide member and the other end connected by a tension spring to the guide assembly frame.

* * * * *